United States Patent [19]
Ota

[11] Patent Number: 5,387,789
[45] Date of Patent: Feb. 7, 1995

[54] CONVERGING LIGHT BEAM FOCUS DETECTOR USING TWO EQUALLY AND OPPOSITELY OFFSET LIGHT BEAM SPOT SIZE DETECTORS

[75] Inventor: Akira Ota, Saitama, Japan

[73] Assignee: Fuji Xerox Co., Ltd., Tokyo, Japan

[21] Appl. No.: 214,189

[22] Filed: Mar. 17, 1994

[30] Foreign Application Priority Data

Mar. 19, 1993 [JP] Japan .................................. 5-083918

[51] Int. Cl.6 .................................................. G01J 1/20
[52] U.S. Cl. .................................. 250/201.7; 250/235
[58] Field of Search ............... 250/201.5, 201.4, 201.7, 250/234, 235, 236; 369/44.14, 44.23, 44.32

[56] References Cited

U.S. PATENT DOCUMENTS

| | | | |
|---|---|---|---|
| 3,454,772 | 7/1969 | Vitt, Jr. et al. | 250/204 |
| 3,937,574 | 2/1976 | Peckham et al. | 356/4 |
| 5,231,280 | 7/1993 | Imakawa | 250/201.5 |

FOREIGN PATENT DOCUMENTS

| | | |
|---|---|---|
| 1-237614 | 9/1989 | Japan . |
| 3-65920 | 3/1991 | Japan . |
| 4-155304 | 5/1992 | Japan . |

Primary Examiner—David C. Nelms
Assistant Examiner—Steven L. Nichols
Attorney, Agent, or Firm—Finnegan, Henderson, Farabow, Garrett & Dunner

[57] ABSTRACT

Two spot size detecting elements are disposed on both sides of an effective scanning area on a scanning surface and spaced from the scanning surface perpendicularly in opposite directions by the same distance, and detect diameters of scanning laser beam. A comparison circuit compares the beam diameters as detected by the two spot size detecting elements. An electrostrictive element attached to a light source deformed in accordance with a comparison result to move the light source so as to correct a converging position of the scanning laser beam.

4 Claims, 2 Drawing Sheets

CONVERGING LIGHT BEAM FOCUS DETECTOR USING TWO EQUALLY AND OPPOSITELY OFFSET LIGHT BEAM SPOT SIZE DETECTORS

BACKGROUND OF THE INVENTION

The present invention relates to a converging position detecting apparatus, in particular, of a type which detects a deviation of a converging position on a scanning surface of a light beam that is emitted from a light source and scans the scanning surface in a converged state.

In conventional scanning optical apparatuses, a laser beam modulated in accordance with an image signal is deflected by a deflector to scan a scanning surface (e.g., the surface of a photoreceptor body) while being converged into a spot image by a converging lens system, to thereby effect recording. These apparatuses are commonly used in, for instance, laser printers. In these apparatuses, the laser beam converging state on the photoreceptor body is detected by a photoelectric conversion element disposed at an end of a scanning line.

In the above scanning optical apparatuses, environmental changes such as a temperature change may cause such problems as thermal deformation in individual parts of the lens system, Light source device, etc., to deviate the converging position of the laser beam perpendicularly to the scanning surface. As a result, the beam diameter (spot size) is increased to lower the image quality.

For example, Japanese Patent Application Unexamined Publication Nos. Hei. 3-65920 and Hei. 1-237614 disclose techniques to solve the above problem.

In an apparatus disclosed in the publication 3-65920, as shown in FIG. 5, a laser beam converging state on a scanning surface is detected by using laser beams reflected at monitoring points 27 and 28. More specifically, the laser beams reflected at the monitoring points 27 and 28 are collimated by respective collimating lenses 21 and 22, respectively reflected by a mirror 23 and a half mirror 24, and then converged onto a one-dimensional image pickup element 26 by an image forming lens 25. An inclination of an image surface 29 is detected by comparing laser beam converging states on the monitoring points 21 and 22.

In an apparatus disclosed in the publication 1-237614, laser beam converging position is detected by two spot size detecting means arranged approximately along the scanning direction spaced from each other perpendicularly to the scanning surface with the laser beam converging position interposed in between.

However, the above-described conventional apparatuses have the following problems.

In the scanning optical apparatus shown in FIG. 5, the laser beams reflected at the monitoring points 27 and 28 are monitored. Therefore, although beam diameters at the monitoring points 27 and 28 are determined, it cannot be determined whether the laser beam converging position is on the scanning surface or deviated from it perpendicularly. As a result, the deviation of the converging position cannot be corrected.

Further, the scanning optical apparatus of FIG. 5 is complex in configuration because the lenses 21, 22 and 25, mirrors 23 and 24, two-dimensional image pickup element 26, etc. are needed to detect beam diameters. Cumbersome operations of positioning the above parts are needed in assembling the scanning optical apparatus. Cumbersome adjustments may be required also when the scanning optical apparatus is in operation, when the respective parts are influenced by vibration, impact or environmental changes such as a temperature change. The deviation of the converging position is likely to happen in this apparatus.

In the second conventional apparatus, the converging position is detected by the two spot size detecting means, which are located at the one end portion on the scanning line. Therefore, the inclination of the image surface from the scanning surface cannot be known.

SUMMARY OF THE INVENTION

An object of the present invention is to provide a converging position detecting apparatus which is low in cost and simple in constitution, and which can detect a deviation, inclination, etc. of an image surface from a scanning surface and correct the deviation.

According to the invention a converging position detecting apparatus in a scanning optical apparatus which scans a scanning surface by a light beam emitted from a light source and converged onto the scanning surface in a regular state, comprises:

two spot size detecting means located on both sides of an effective scanning area of the scanning surface and spaced from the scanning surface perpendicularly in opposite directions by substantially the same distance, for detecting beam diameters of the light beam; and means for correcting a converging position of the light beam based on the detected beam diameters so that the converging position is located on or close to the scanning surface.

DESCRIPTION OF THE PREFERRED EMBODIMENTS

An embodiment of the present invention will be described in detail with reference to the accompanying drawings.

Figure 1:
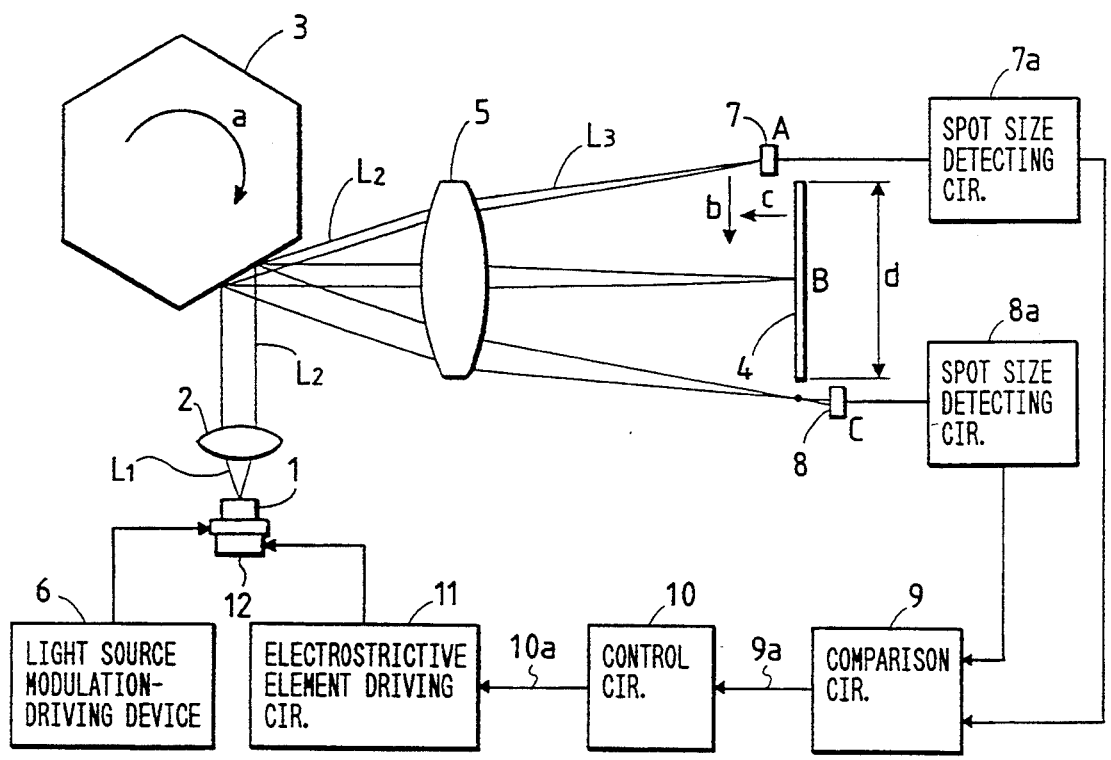
FIG. 1 schematically shows a configuration of a scanning optical apparatus having a converging position detecting apparatus according to an embodiment of the present invention.
Figure 5:
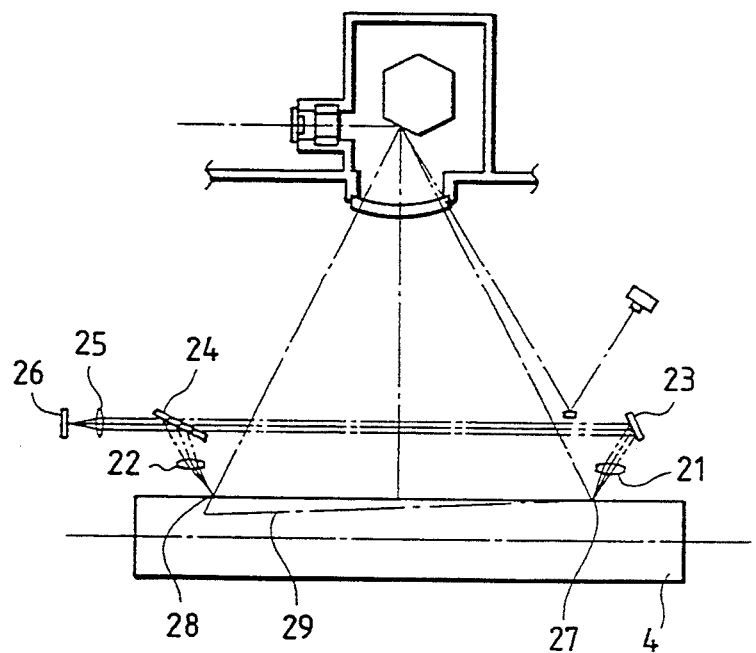
FIG. 5 shows a configuration of a conventional scanning optical apparatus.

FIG. 1 schematically shows a scanning optical apparatus having a converging position detecting apparatus according to the embodiment.

In FIG. 1, a laser light source 1 emits a modulated laser beam $L_1$ while being modulation-driven by a light source modulation-driving device 6. A collimating lens 2 converts the laser beam $L_1$ emitted from the laser light source 1 to a parallel laser beam $L_2$. A rotary polygon mirror 3, which is located downstream of the collimating lens, deflects the laser beam $L_2$. An $f\theta$ lens 5 produces a laser beam $L_3$ by converging the laser beam $L_2$. The laser beam $L_3$ is converged onto a recording medium 4, i.e., a scanning surface. Scanning is made by the laser beam $L_3$ which moves on the scanning surface in a direction indicated by an arrow b as the polygon mirror rotates in a direction indicated by an arrow a.

First and second spot size detecting means 7 and 8 are disposed at positions A and C on both sides of an effective scanning area of a length d, and spaced perpendicularly from the scanning surface in opposite directions by the same distance. Each of the first and second spot size detecting means 7 and 8 has a known configuration including a knife edge, a slit and a CCD. Signals indicating beam diameters as detected by the spot size detecting means 7 and 8 are respectively input to spot size detecting circuits 7a and 8a.

A comparison circuit 9 compares the beam diameters based on the signals sent from the spot size detecting circuits 7a and 8a and sends a comparison signal 9a to a control circuit 10. For example, if the beam diameter as detected by the circuit 7a is larger than that detected by the circuit 8a, the comparison circuit 9 outputs a H-level comparison signal 9a. Conversely, if the beam diameter as detected by the circuit 7a is smaller than that as detected by the circuit 8a, the comparison circuit 9 outputs a L-level comparison signal 9a. The control circuit 10 produces a control signal 10a based on the comparison signal 9a and sends it to an electrostrictive element driving circuit 11.

The electrostrictive element driving circuit 11 deforms an electrostrictive element 12 in accordance with the control signal 10a. The laser light source 1 is moved forward or backward by deformation of the electrostrictive element 12 until the beam diameters as detected by the first and second spot size detecting means 7 and 8 become identical. As a result, the laser beam $L_3$ is corrected so as to be duly converged onto the scanning surface.

Figure 2A:
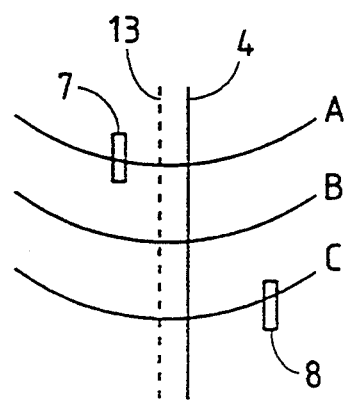
FIGS. 2(a) and 2(b) illustrate how a parallel deviation of an image surface is corrected.
Figure 2B:
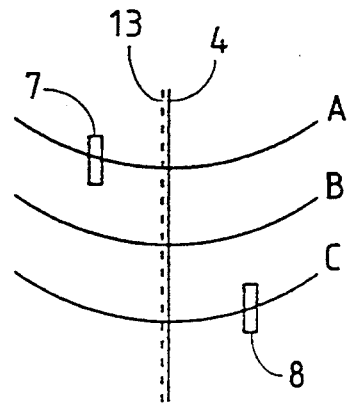

FIGS. 2(a) and 2(b) illustrate a converging position adjustment on the laser beam $L_3$ according to the embodiment. The parts in FIGS. 2(a) and 2(b) that are the same as or equivalent to those in FIG. 1 are given the same reference symbols. In FIGS. 2(a) and 2(b), a distance with respect to the surface of the recording medium 4 is indicated in the direction perpendicular to the recording medium 4, i.e., the horizontal direction in those figures, and the beam diameter is indicated in the direction in parallel with the surface of the recording medium 4. For example, in the case of a curve A shown in FIG. 2(a), the beam diameter is smallest at the converging position 13 and increases with the distance from the converging position 13.

As shown in FIG. 2(a), if the converging line 13 of the laser beam $L_3$ is located in front of the recording medium 4, the beam diameter as detected by the first spot size detecting means 7 is small and that as detected by the second spot size detecting means 8 is large.

In this case, the comparison circuit 9 outputs a level L-level comparison signal 9a, and the control circuit 10 outputs the control signal 10a accordingly. The electrostrictive element driving circuit 11 drives the electrostrictive element $L_2$ in accordance with the control signal 10a. As a result, the laser light source 1 is moved forward, so that the converging position 13 of the laser beam $L_3$ is corrected so as to be located on the scanning surface of the recording medium 4 as shown in FIG. 2(b).

As described above, according to the embodiment, when the converging line 13 of the laser beam $L_3$ is located in front of or in rear of the scanning surface and is in parallel with it, the converging line 13 can be corrected so as to shift onto the scanning surface.

Figure 3A:
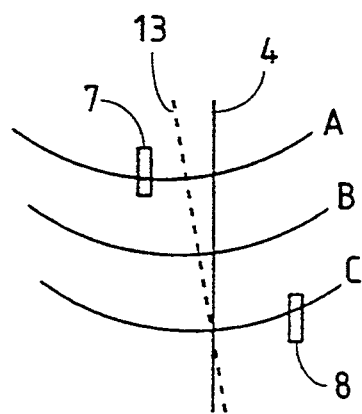
FIGS. 3(a), 3(b), 4(a) and 4(b) illustrate how a deviation of the image surface is corrected even where the deviation includes an inclination component.
Figure 3B:
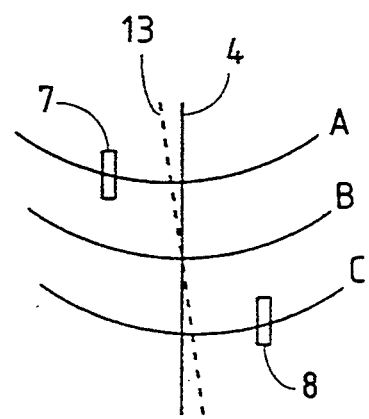

According to the embodiment, the converging line of the laser beam $L_3$ can be corrected even where it is inclined from the scanning surface. This will be explained below with reference to FIGS. 3(a)–4(b). For example, where the converging position 13 associated with the position A is located in front of the scanning surface and that associated with the position C is on the scanning surface (see FIG. 3(a)), the beam diameter as detected by the first spot size detecting means 7 is small and that as detected by the second spot size detecting means 8 is large. FIG. 3(b) shows a state in which correction has been so made that the beam diameters as detected by the first and second spot size detecting means 7 and 8 become identical.

Figure 4A:
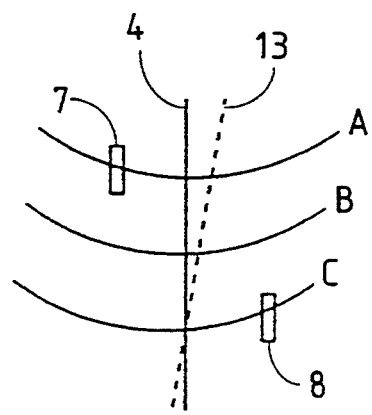
Figure 4B:
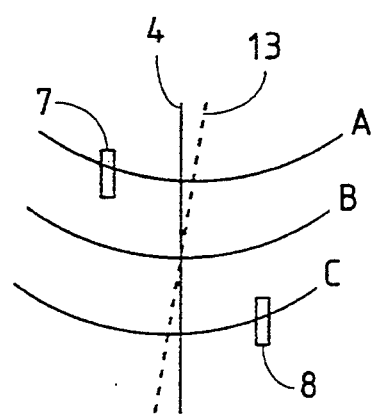

On the other hand, where the converging position 13 associated with the position A is located in rear of the scanning surface and that associated with the position C is on the scanning surface (see FIG. 4(a)), the beam diameter as detected by the first spot size detecting means 7 is large and that as detected by the second spot size detecting means 8 is small. FIG. 4(b) shows a state in which correction has been so made that the beam diameters as detected by the first and second spot size detecting means 7 and 8 become identical.

As is understood from FIGS. 3(b) and 4(b), the converging line 13 of the laser beam $L_3$ crosses the scanning surface at its center and deviates by the same distance at both ends of the scanning surface. However, it is apparent that a great improvements are obtained from the converging states shown in FIGS. 3(a) and 4(a).

While in the above embodiment the converging line 13 is corrected by deforming the electrostrictive element 12, it may be corrected by moving the collimating lens 2. While in the above embodiment the first and second spot size detecting means 7 and 8 are respectively located at the positions A and C, their positions may be interchanged. Further, while in the above embodiment the first and second spot size detecting means 7 and 8 are respectively located in front of and in rear of the scanning surface, their positions may be interchanged in this respect, too.

According to the invention, the front-rear deviation and inclination of the image surface from the scanning surface and can be detected based on the relationship between the beam diameters as detected by the two spot size detecting means. And the position of the image surface can be corrected so as to be located at an optimal position for its front-rear deviation and inclination.

The number of parts constituting the converging position detecting apparatus, which parts may be influenced by environmental changed such as a temperature change, is reduced and, accordingly, the number of parts that require adjustment is decreased. This will improve the ease of operation in using the apparatus.

What is claimed is:

1. A converging position detecting apparatus in a scanning optical apparatus which scans a scanning surface by a light beam emitted from a light source and converged onto the scanning surface in a regular state, comprising:

two spot size detecting means disposed on both sides of an effective scanning area of the scanning surface and spaced from the scanning surface perpendicularly in opposite directions by substantially the same distance, for detecting beam diameters of the light beam; and means for correcting a converging position of the light beam based on the detected beam diameters so that the converging position is located on or close to the scanning surface.

2. The converging position detecting apparatus of claim 1, further comprising an electrostrictive element attached to the light source, wherein the correcting means corrects the converging position by moving the light source in its light emitting direction by deforming the electrostrictive element based on the detected beam diameters.

3. The converging position detecting apparatus of claim 1, further comprising a collimating lens for collimating the light beam as emitted from the light source, wherein the correcting means corrects the converging position by moving the collimating lens in a light emitting direction of the light source based on the detected beam diameters.

4. The converging position detecting means of claim 1, wherein the correcting means corrects the converging position so that the beam diameters as detected by the two spot size detecting means become substantially identical.

* * * * *